US006918208B2

(12) United States Patent
Oberheide et al.

(10) Patent No.: US 6,918,208 B2
(45) Date of Patent: Jul. 19, 2005

(54) LEAD SCREW WINDOW REGULATOR

(75) Inventors: G. Clarke Oberheide, Troy, MI (US); Denis R. Cloutier, Newmarket (CA); Noel Chingcuanco, North York (CA); Peter J. Smith, Newmarket (CA)

(73) Assignee: Intier Automotive Closures Inc., Newmarket (CA)

( * ) Notice: Subject to any disclaimer, the term of this patent is extended or adjusted under 35 U.S.C. 154(b) by 46 days.

(21) Appl. No.: 10/449,320

(22) Filed: May 30, 2003

(65) Prior Publication Data

US 2004/0045221 A1 Mar. 11, 2004

Related U.S. Application Data

(60) Provisional application No. 60/384,741, filed on May 30, 2002.

(51) Int. Cl.[7] .......................... E05F 15/08; E05F 11/00; B60J 5/04; F16H 27/02

(52) U.S. Cl. ............................ 49/349; 49/502; 49/337; 74/89.14

(58) Field of Search .......................... 49/349, 348, 502, 49/374, 372, 337, 339, 335, 506; 74/89.14, 89.13, 89.17

(56) References Cited

U.S. PATENT DOCUMENTS

| | | | | |
|---|---|---|---|---|
| 2,336,530 A | | 12/1943 | Chandler et al. | |
| 4,074,463 A | * | 2/1978 | Colanzi | 49/352 |
| 4,167,834 A | | 9/1979 | Pickles | |
| 4,170,877 A | | 10/1979 | Pickering | |
| 4,182,078 A | | 1/1980 | Bartholomew | |
| 4,389,818 A | | 6/1983 | Sakamoto | |
| 4,433,508 A | * | 2/1984 | Carletta | 49/348 |
| 4,908,988 A | | 3/1990 | Yamamura et al. | |
| 4,967,510 A | | 11/1990 | Torii et al. | |
| 4,991,348 A | | 2/1991 | Yamamura et al. | |
| 5,012,613 A | | 5/1991 | Sekine | |
| 5,309,677 A | | 5/1994 | Kunert et al. | |
| 5,537,782 A | | 7/1996 | Klippert et al. | |
| 5,806,244 A | | 9/1998 | Tilli | |
| 6,216,394 B1 | | 4/2001 | Fenelon | |
| 6,430,874 B1 | | 8/2002 | Korte | |
| 6,655,089 B2 | * | 12/2003 | Le Gallo | 49/352 |
| 6,655,092 B2 | * | 12/2003 | Pacella et al. | 49/506 |
| 2002/0007599 A1 | | 1/2002 | Pacella et al. | |

* cited by examiner

*Primary Examiner*—Hugh B. Thompson, II
(74) *Attorney, Agent, or Firm*—Clark Hill PLC

(57) ABSTRACT

A window-regulating assembly selectively moves a window of a vehicle door between an open position and a closed position. The window-regulating assembly includes a rail that is fixedly secured to the vehicle door. The rail extends through a radius of curvature. A lift plate is slidably engaged with the rail. The lift plate is also secured to the window. The lift plate moves the window between the open and closed positions. A lead screw is secured to the rail. The lift plate travels along the lead screw to move the window between the open and closed positions. A drive motor is secured to lift plate. The drive motor receives electrical energy and converts the electrical energy into a selectively bidirectional rotational force to drive the lift plate over the lead screw. A pivot mount extends between the drive motor and the lift plate allowing the drive motor to move through the radius of curvature as the lift plate slides along the rail.

13 Claims, 5 Drawing Sheets

LEAD SCREW WINDOW REGULATOR

This application claims the benefit of Provisional application Ser. No. 60/384,741, filed May 30, 2002.

FIELD OF THE INVENTION

The invention relates to a system for moving a component part of a motor vehicle. In particular, the invention relates to a regulator used to selectively provide access to an enclosure of a motor vehicle.

DESCRIPTION OF THE RELATED ART

Doors of motor vehicles are designed to withstand a hostile environment. The doors have to endure the environment created by the operation of the motor vehicle. And the doors have to be designed to tolerate abrupt movement and jarring engagement with the motor vehicle as they are being closed.

These requirements that the door must withstand result in the design of doors that are heavy and durable. The added weight in the doors due to these design parameters affect the operability of the doors as well as the fuel efficiency of the motor vehicle.

One of the systems found within the door of a motor vehicle is the window regulator. The window regulator must move a window between its open and closed positions. The window regulator must be strong to move the window glass and robust enough to survive the harsh environment of the door. Typically, these parameters result in a window regulator that is large, heavy and powerful. There is a desire to design a window regulator that is strong and powerful, yet lighter in weight and smaller in size.

SUMMARY OF THE INVENTION

A window-regulating assembly selectively moves a window of a vehicle door between an open position and a closed position. The window-regulating assembly includes a rail that is fixedly secured to the vehicle door. The rail extends through a radius of curvature. A lift plate is slidably engaged with the rail. The lift plate is also secured to the window. The lift plate moves the window between the open and closed positions. A lead screw is secured to the rail. The lift plate travels along the lead screw to move the window between the open and closed positions. A drive motor is secured to the lift plate. The drive motor receives electrical energy and converts the electrical energy into a selectively bidirectional rotational force to drive the lift plate over the lead screw. A pivot mount extends between the drive motor and the lift plate allowing the drive motor to move through the radius of curvature as the lift plate slides along the rail.

BRIEF DESCRIPTION OF THE DRAWINGS

Advantages of the invention will be readily appreciated, as the same becomes better understood by reference to the following detailed description when considered in connection with the accompanying drawings, wherein.

DETAILED DESCRIPTION OF THE PREFERRED EMBODIMENT

Figure 1:
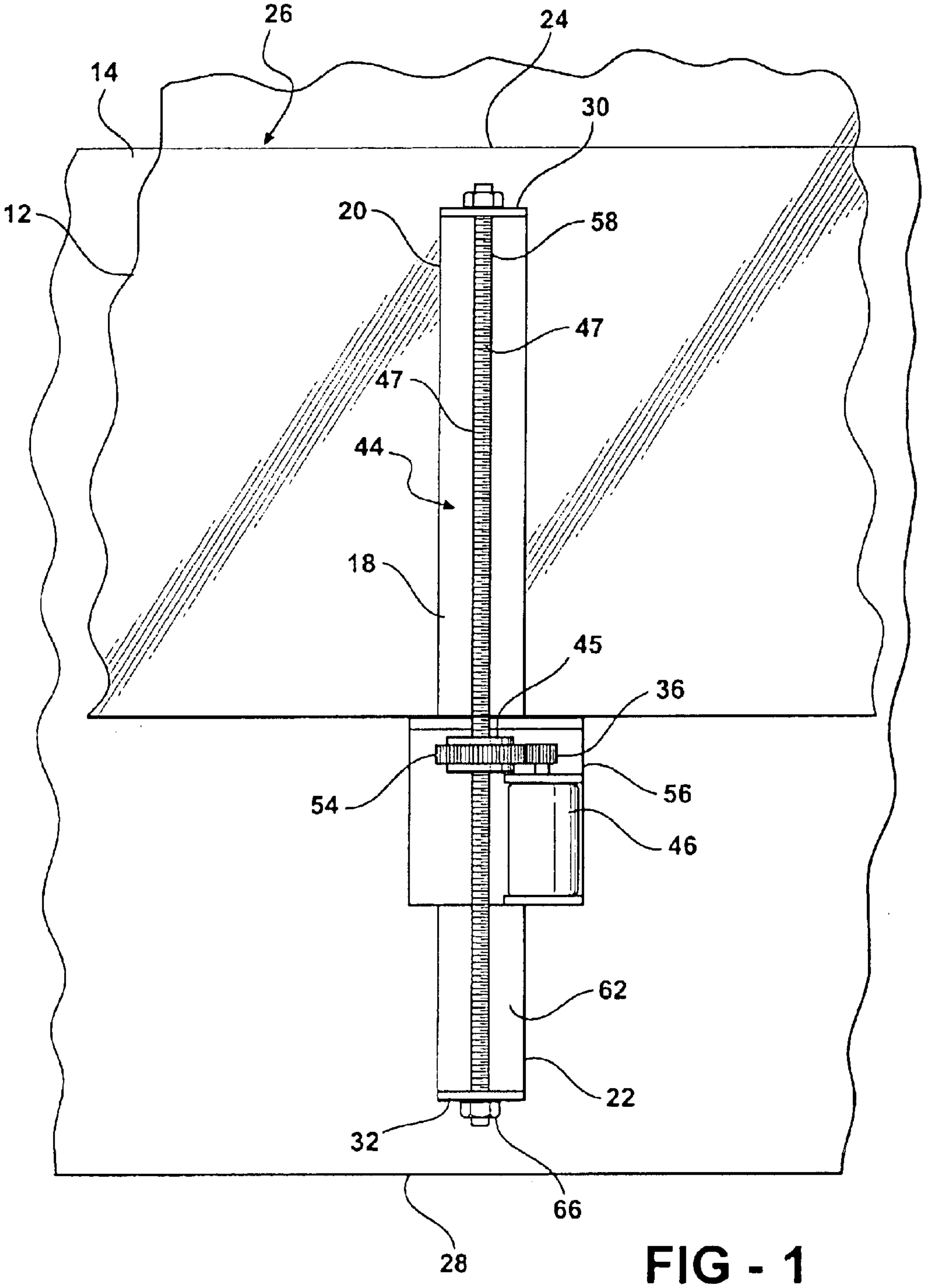
FIG. 1 is a side view of a first embodiment of the invention in a vehicle door.

Referring to the Figures, wherein like primed reference characters represent similar elements through the different embodiments, a window-regulating assembly is generally indicated at 10. The window-regulating assembly 10 is used in a vehicle door 12 that has a window 14. The window-regulating assembly 10 moves the window 14 between an open position and a closed position. The window 14 slides between these position and does not pivot. While the vehicle door 12 is shown with a frame 16 defining the opening that the window 14 may close, it should be appreciated by those skilled in the art that the vehicle door 12 may not include a frame 16.

The window-regulating assembly 10 includes a rail 18. The rail 18 extends between a top end 20 and a bottom end 22. The top end 20 is spaced apart from an upper edge 24 of a door body 26. The bottom end 22 is disposed adjacent a lower edge 28 of the door body 26.

Figure 2:
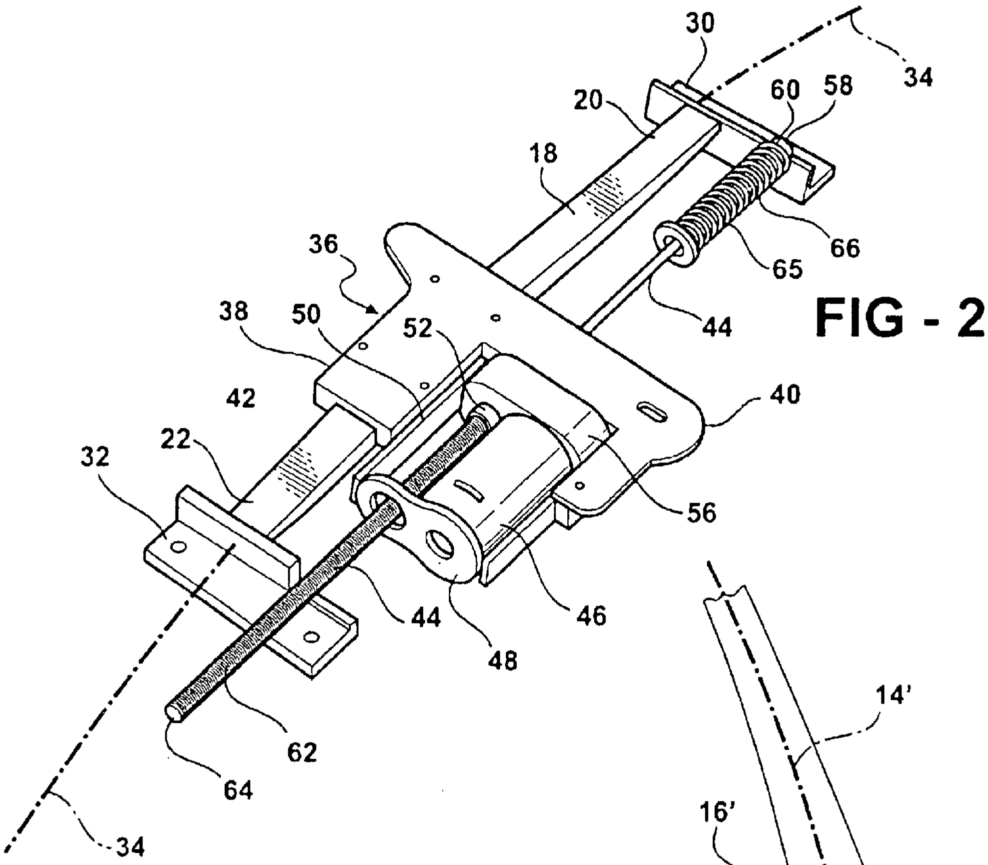
FIG. 2 is a perspective view of the first embodiment of the invention.
Figure 3:
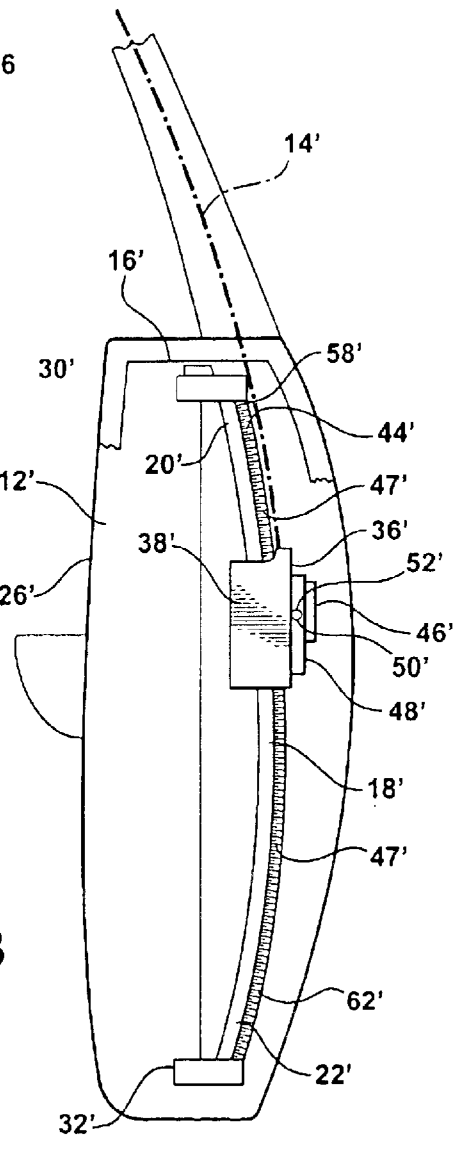
FIG. 3 is a side view of an alternative embodiment of the invention.
Figure 4:
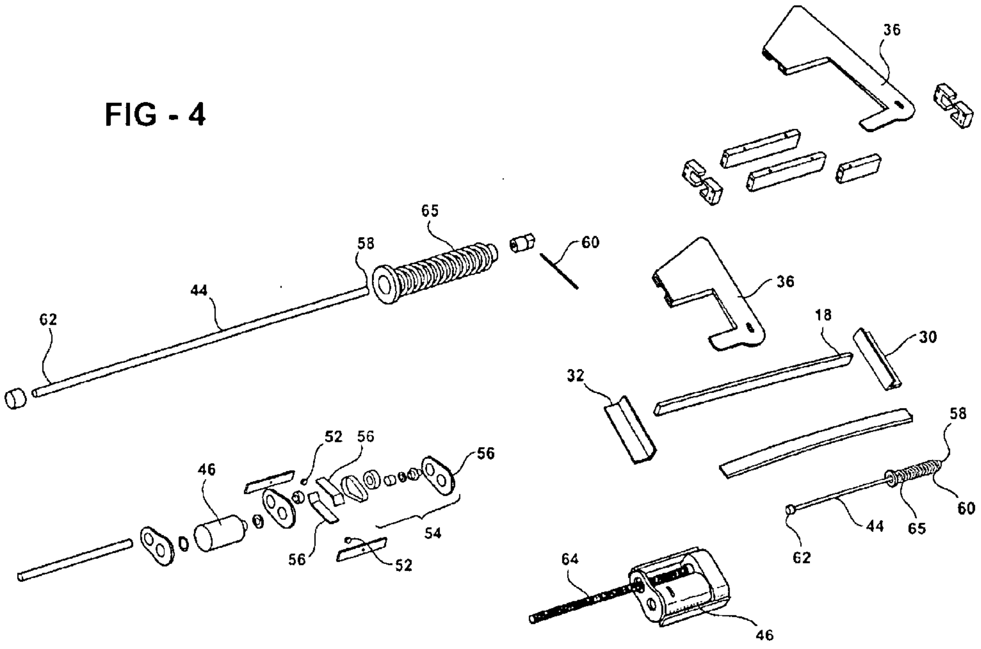
FIG. 4 is an exploded perspective view of the first embodiment of the invention.

Referring specifically to FIG. 2, the rail 18 is mounted to the door body 26 via upper 30 and lower 32 brackets. The rail 18 extends through a curvilinear path. More specifically, the rail 18 defines a radius of curvature 34. The radius of curvature 34 generally follows the contour of the door body 26.

A lift plate 36 slidingly engages the rail 18. The lift plate 36 includes a slide portion 38 and a mount portion 40. The slide portion 38 defines channels 42 that engage the rail 118. The mount portion 40 extends perpendicularly to the slide portion 38. The mount portion 40 receives the window 14 thereon. The window 14 is mounted to the mount portion 40.

A lead screw 44 is secured to the rail 18. The lift plate 36 travels along the lead screw 44 to move the window 14 between its open and closed positions. The lead screw 44 does not rotate. A rotating nut 45 rotates over the lead screw. The rotating nut 45 will be described in greater detail subsequently.

The window-regulating assembly 10 also includes a drive motor 46. The drive motor 46 receives electrical energy and converts the electrical energy into a selectively bidirectional rotational force. The rotational force drives the lift plate 36 over the lead screw 44. The drive motor 46 is mounted to the mount portion 40 of the lift plate 36. Therefore, the drive motor 46 moves as the lift plate 36 moves along the rail 18.

The drive motor 46 is mounted to the mounting portion 40 via a motor bracket 48. The motor bracket 48 is pivotally secured to the mount portion 40 of the lift plate 36. A pivot mount 50, including pivot pins 52 (one shown), defines the axis about which the drive motor 46 and motor bracket 48 pivot. The pivot pins 52 are located along the motor bracket 48 at a location that identifies the center of mass for the drive motor 46. This location of the pivot pins 52 minimizes the forces required to pivot the drive motor 46 through the radius of curvature as the lift plate 36 slides along the rail 18.

Figure 5:
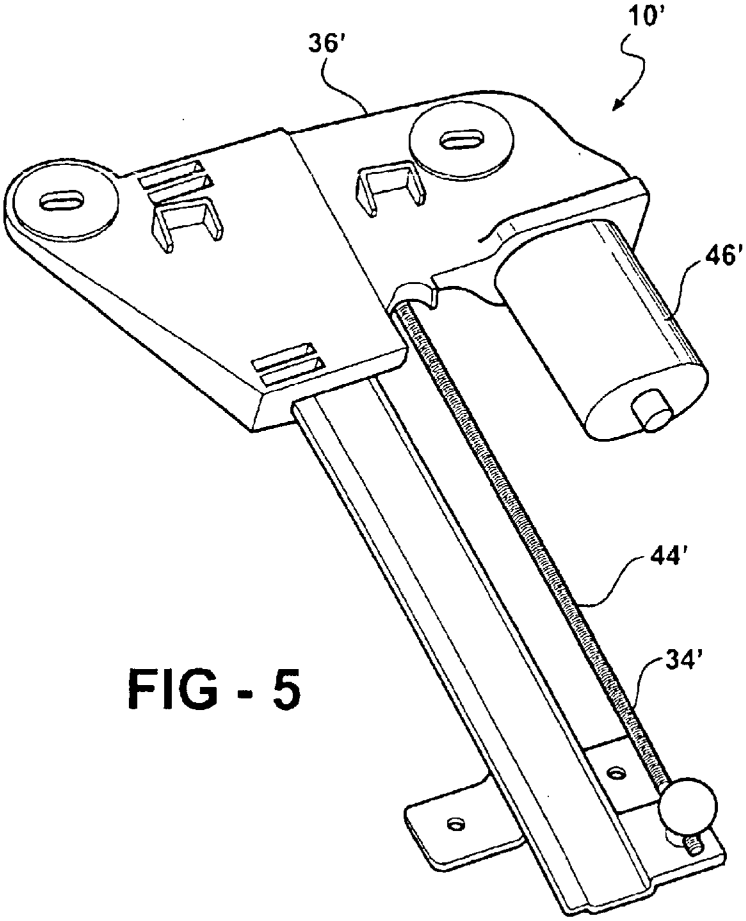
FIG. 5 is an outside perspective view of the alternative embodiment of the invention.
Figure 7:
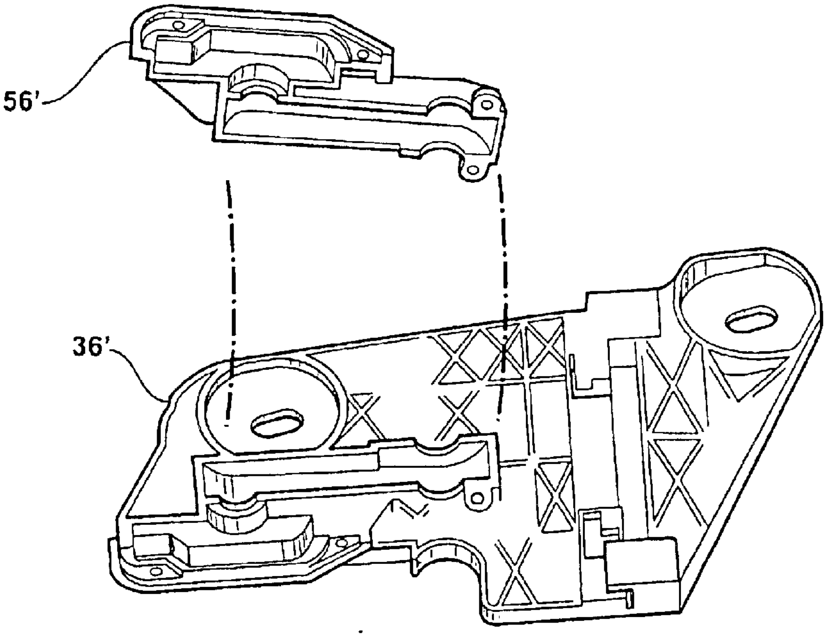
FIG. 7 is an exploded view of a lift plate and gearbox cover for the alternative embodiment of the invention.
Figure 6:
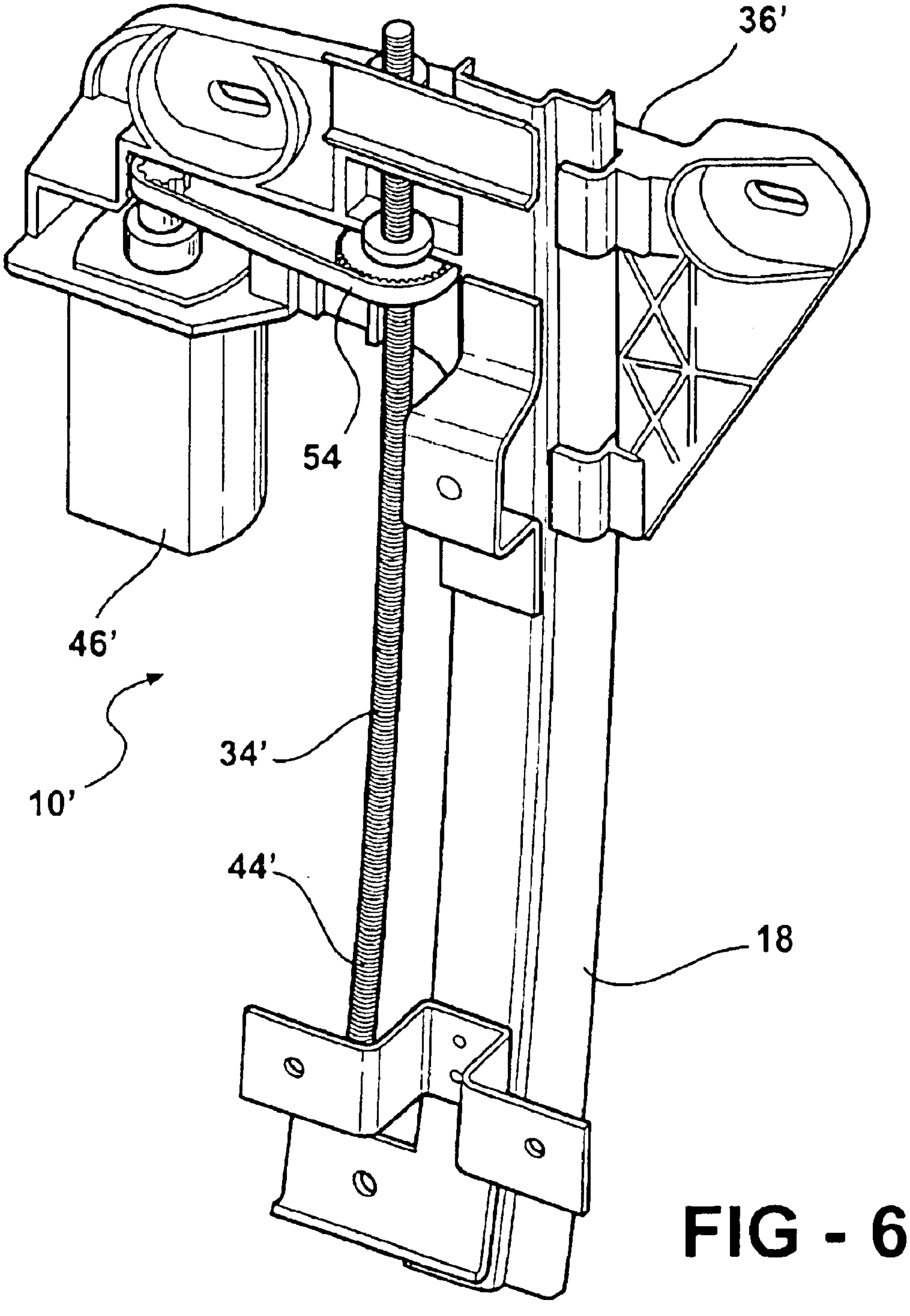
FIG. 6 is an inside perspective view of the alternative embodiment of the invention.

The motor bracket 48 houses a transmission 54 within a transmission housing 56. The transmission 54 extends between the drive motor 46 and the lead screw 44 to translate the rotational force generated by the drive motor 46 into a linear force directed along the lead screw 44 to move the lift plate 36 and the window 14 through the curvilinear path defined by the radius of curvature 34. As is shown in FIGS. 5 through 7, the lift plate 36' and the transmission housing 56' are integrally molded.

The transmission 54 may include a belt having a width of 3–6 mm in the tooth pitch of approximately 2 mm. The belt drives the rotating nut 45 that engages threads 47 of the lead screw 44. The transmission 54 defines a drive ratio of approximately 1:2 from the drive motor 46 to the nut.

Referring to FIGS. 1 and 2, the lead screw 44 extends through a straight, linear path. Because the lead screw 44 is straight, an upper end 58 of the lead screw 44 is pivotally secured to the rail 18. More specifically, the lead screw 44 is secured to the upper bracket 30 of the rail 18 via a pin 60. A lower end 62 of the lead screw 44 is not secured in a fixed manner. This provides the freedom for the lead screw 44 to pivot about the axis defined by the pin 60. As may be seen in FIG. 2, a protective sleeve 64 may be employed to protect the lower end 62 of the lead screw 44.

Stops 66 at both ends 58, 62 of the lead screw 44 are employed to ensure the drive motor 46 does not rotate beyond the prescribed travel path of the window 14. In FIG. 2, a stop 66 is not shown at the lower end 62. The protective sleeve 64 may engage a stop or the bottom of the door body 26 to prevent movement of the drive motor 46 and window 14 below a predetermined level.

Referring specifically to FIGS. 3 and 5 through 7, an alternative embodiment of the window-regulating assembly 10' is shown. In this embodiment, the lead screw 44' extends through the curvilinear path defined by the radius of curvature 34'. Because the lead screw 44' extends through the curvilinear path, the pin 60 of the first embodiment is not needed. The lead screw 44' is fixedly secured to the upper 30' and lower 32' brackets of the rail 18'. The ability for the window-regulating assembly 10' to move through the radius of curvature 34' is achieved by the pivot mount 50' that allows the drive motor 46' to move through the radius of curvature 34'.

The curved lead screw 44' is designed to have a radius of curvature equal to the radius of curvature of the glass window 14'. The lead screw 44' is fixed at both ends 58', 62' with a fore-aft degree of freedom using keyhole slots in the upper 30' and lower 32' brackets. An advantage of the curved lead screw 44' is that it can be used with steeper glass curvatures and longer travels since cross-car packaging constraints are minimized.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A window regulator assembly for selectively moving a vehicle window between an open position and a closed position, said window regulator assembly comprising:

a rail assembly adapted to be securable to a vehicle door and extending through a radius of curvature of a travel path of a vehicle window;

a lift plate slidably engaging said rail assembly for traveling therealong; and adapted to have the window being fixedly securable to said lift plate;

a lead screw is secured to said rail assembly; and a drive motor pivotally mounted to said lift plate and operatively engaging said lead screw whereby selective bi-directional energizing of said motor moves said motor along said lead screw and effects said travel of said lift plate.

2. The assembly as set forth in claim 1 including a pivot mount pivotally securing said drive motor to said lift plate at a center of mass of said drive motor.

3. The assembly as set forth in claim 2 including a transmission extending between said drive motor and said lead screw to translate the rotational force generated by said drive motor into a linear force directed along said lead screw to move said lift plate and the window through a curvilinear path defined by said radius of curvature.

4. The assembly as set forth in claim 3 wherein said transmission includes a rotating nut, said rotating nut threadingly engagable with said lead screw.

5. The assembly as set forth in claim 4 wherein said transmission includes a belt extending between said drive motor and said rotating nut.

6. The assembly as set forth in claim 5 wherein said lead screw extends through said curvilinear path defined by said radius of curvature.

7. The assembly as set forth in claim 5 wherein said lead screw extends through a straight, linear path.

8. The assembly as set forth in claim 7 wherein said lead screw extends between an upper end and a lower end.

9. The assembly as set forth in claim 8 wherein said upper end of said lead screw is pivotally secured to said rail.

10. The assembly as set forth in claim 9 wherein said lower end of said lead screw is free to move as said drive motor rotates allowing said drive motor to move through said curvilinear path.

11. The assembly as set forth in claim 10 wherein said lower end of said lead screw includes a stop to prevent said rotating nut from rotating therepast.

12. The assembly as set forth in claim 11 further comprising sleeves surrounding said lead screw on opposite sides of said lift plate.

13. A window-regulating assembly for selectively moving a window of a vehicle door between an open position and a closed position, said window-regulating assembly comprising:

a rail fixedly adapted to be secured to the vehicle door and extending through a radius of curvature of the vehicle door;

a lift plate slidably engaged with said rail and adapted to have the window fixedly secured thereto such that said lift plate moves the window between the open and closed positions;

a lead screw secured to said rail, said lift plate traveling along said lead screw to move the window between the open and closed positions;

a drive motor secured to said lift plate, said drive motor receiving electrical energy and converting the electrical energy into a selectively bidirectional rotational force to drive said lift plate over said lead screw, said drive motor defining a center of mass; and a pivot mount extending between said drive motor and said lift plate allowing said drive motor to move through said radius of curvature as said lift plate slides along said rail.

* * * * *